June 25, 1957     J. N. SCHUMACHER     2,796,852
MEANS IN COMBINATION WITH AN INTERNAL COMBUSTION ENGINE
FOR INCREASING THE POWER OF THE ENGINE
Filed Sept. 23, 1955

INVENTOR
John N. Schumacher
BY John Mahoney
ATTORNEY

United States Patent Office

2,796,852
Patented June 25, 1957

2,796,852

MEANS IN COMBINATION WITH AN INTERNAL COMBUSTION ENGINE FOR INCREASING THE POWER OF THE ENGINE

John N. Schumacher, Cleveland, Ohio, assignor of fifty percent to Dan W. Duffy, Cleveland, Ohio Application September 23, 1955, Serial No. 536,249

18 Claims. (Cl. 123—25)

The present invention relates to internal combustion engines and more particularly to improved means in combination with an internal combustion engine for increasing the power of the engine.

It has heretofore been proposed to introduce steam into a passageway leading to the combustion chambers of an internal combustion engine to cause a more complete mixture of the air and fuel than is generally obtained to thereby improve the combustion of the fuel and to reduce the tendency of the engine to knock or detonate under load. In such prior practice, however, the steam has not been introduced into the passageway leading to the combustion chambers of the engine in a manner to substantially increase the velocity and pressure of the air which is drawn into the combustion chambers of the engine when high power is required.

According to the present invention, conduit means having a projection provided with a small outlet orifice is provided which projection extends into a passageway leading to the combustion chamber or chambers of an internal combustion engine for introducing a small amount of a gas at a comparatively high pressure and velocity into a passageway leading to a combustion chamber or the combustion chambers of the engine and in which means associated with the conduit means are preferably provided for inducting a large volume of air at a comparatively high pressure and velocity into the passageway leading to the combustion chamber or combustion chambers of the engine to thereby increase the power of the engine when the engine is under such load that high power is required. My invention also contemplates means for reducing or discontinuing the supply of gas at high pressure to the passageway leading to the combustion chamber or chambers of the engine when the engine does not require more power than that provided by the mixture of fuel and air at atmospheric pressure. While the gas which is utilized may be of any desired type that will not adversely affect the combustible mixture of the air and fuel in the combustion chamber or combustion chambers of the engine, in accordance with the invention, a gas is preferably utilized which is in the form of a vapor which may act as a supplementary fuel or which assists in preventing the detonation of the engine when the engine is under heavy load, such as steam, the vapors of an antiknock liquid, which may also serve as a supplementary fuel, or a mixture of steam and the vapors of an antiknock liquid.

It is therefore an object of the present invention to provide improved means in combination with an internal combustion engine for increasing the power of the engine when the engine is under such loads that high power is required.

Another object of the invention is to provide means in combination with an internal combustion engine, to which fuel is supplied in the usual manner, for passing a gas at a comparatively high pressure through conduit means having a comparatively small orifice which conduit means extends into a passageway leading to the combustion chamber or combustion chambers of the engine and in which means associated with the conduit means and arranged in the passageway are provided for inducting a large volume of air at a comparatively high velocity and pressure into the passageway to provide a comparatively high pressure of a mixture of air, gas and fuel in the combustion chamber or combustion chambers of the engine to increase the power of the engine.

A further object of the invention is to provide means in combination with an internal combustion engine for generating vapors which when mixed with air and fuel in the combustion chamber or combustion chambers of the engine assist in preventing detonation of the engine when the engine is under heavy load, such as steam, the vapors of an antiknock liquid, or a mixture thereof, and in which conduit means in combination with the generated vapors has a projection provided with a comparatively small orifice extending into a passageway leading to the combustion chamber or combustion chambers of the engine through which the generated vapors may be passed at a comparatively high velocity and pressure and in which means associated with the conduit means and arranged in the passageway are provided for inducting a large volume of air at a comparatively high velocity and pressure into the passageway to provide a comparatively high pressure of the mixture of air, fuel, and vapors in the combustion chamber or combustion chambers of the engine to increase the power of the engine.

A still further object of the invention is to provide means in combination with an internal combustion engine, to which fuel is supplied in the usual manner, for generating vapors, such as steam, the vapors of an antiknock liquid, or a mixture thereof, and in which conduit means in communication with the generated vapors has a comparatively small outlet orifice arranged in a passageway leading to the combustion chamber or combustion chambers of the engine so that the vapors in the form of a jet will issue therefrom and in which means associated with the conduit means are provided to induct a large volume of air into the passageway at a comparatively high velocity and pressure to provide a comparatively high pressure of the mixture of air, vapors, and fuel in the combustion chamber or the combustion chambers of the engine when the engine requires comparatively high power, and in which means are provided for terminating the flow of vapors into the passageway when the engine does not require more power than that provided by the normal intake of a mixture of air and fuel at atmospheric pressure.

My invention may be utilized in combination with an internal combustion engine of any desired type, such as stationary or movable internal combustion engines provided with a single or multiple combustion chambers, and in which the fuel may be gasoline, as utilized in automobiles or airplanes provided with the usual carburetor, or oil as utilized in diesel engines which is injected directly into the combustion chamber or combustion chambers of the engine. For purposes of illustration, an engine of the automotive type is shown in the accompanying drawings in which.

Figure 1:
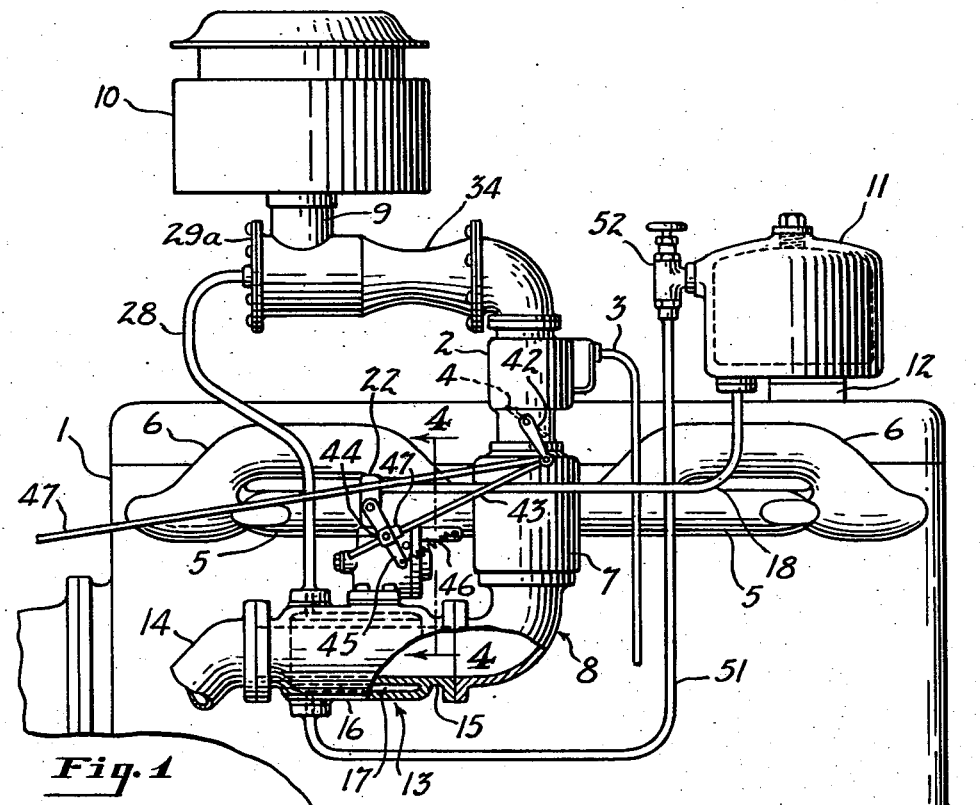
Fig. 1 is a side elevational view of an internal combustion engine with parts broken away and a side elevational view of my improved apparatus with parts in section.
Figures 2, 3, 4:
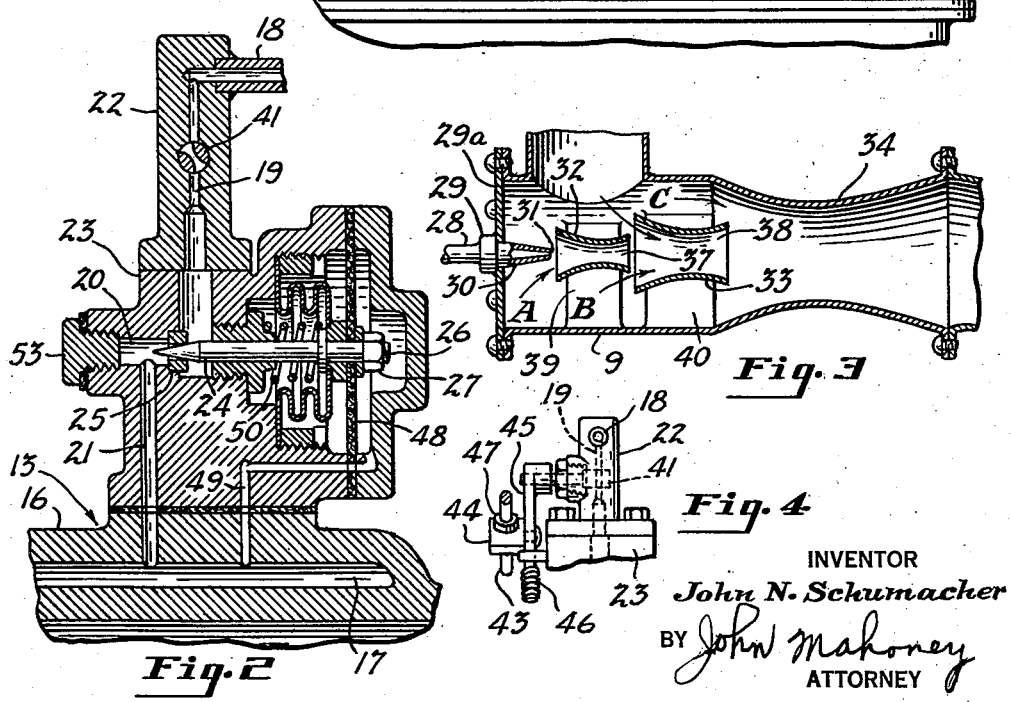
Fig. 2 is an enlarged sectional view of a portion of the apparatus.
Fig. 3 is an enlarged detail view in section of another portion of the apparatus.
Fig. 4 is a side elevational view taken on a plane passing through the line 4—4 of Fig. 1 looking in the direction of the arrows with parts shown in cross section.

Referring to the drawings, the numeral 1 designates an internal combustion engine provided with the usual cylinders and combustion chambers and having a carburetor 2 associated therewith to which fuel is supplied by conduit means 3 leading from a suitable fuel pump, not shown. The carburetor is provided with the usual throttle valve 4 and the engine has an intake manifold 5 and an exhaust manifold 6 which exhaust manifold terminates in a casing 7 which is connected to conduit means 8 constituting part of the exhaust pipe. As shown, a pipe 9 having a filter or cleaner 10 connected to its inlet orifice provides a passageway for the air and gas to the combustion chamber or combustion chambers of the engine.

In accordance with the present invention, means are provided for forcing the gas or vapors through conduit means arranged in the air passageway leading to the combustion chamber or chambers of the engine. Although my invention is not limited thereto, the gas which is utilized is preferably in the form of vapors which assist in preventing detonation of the engine when the engine is under heavy load, such as steam, the vapors of an antiknock liquid, such as the vapors of ethyl or butyl alcohol, tetraethyl lead, or acetone, or a mixture of steam and the vapors of one or more of the antiknock liquids. If desired, the antiknock liquid may be of a type which also acts as a supplementary fuel, such as ethyl or butyl alcohol. When a mixture of steam and the vapors of an anti-knock liquid are utilized, the water and liquid from which the steam and the antiknock vapors or supplementary fuel are generated, should preferably be miscible with each other.

As illustrated in the drawings, the gas which is utilized is in the form of vapors, and the apparatus includes a closed tank 11 for the liquid which is to be vaporized. The tank 11 may be supported in any desirable manner, such as by a bracket 12 secured to the engine and means communicating with tank 11 and arranged in heat exchange relation with the exhaust gases from the engine is provided for vaporizing the liquid. While any suitable means may be provided for this purpose, such as conduit means having a portion arranged within the exhaust pipe of the engine, or portions exposed to the exhaust gases or a portion of the exhaust gases from the engine, as shown in the drawings, an evaporator 13 is provided which extends between exhaust pipe 8 and a second exhaust pipe 14 connected to the muffler and the tail pipe of a vehicle in the usual manner. The evaporator 13 consists of conduit means 15 connected to exhaust pipes 8 and 14 by suitable means, such as welding, and an annular casing 16 surrounding and arranged in spaced relation to conduit means 15 to form a vaporizing chamber 17, and means are provided for conducting liquid from tank 11 to the vaporizing chamber 17 and for conducting vapors therefrom. For conducting liquid from tank 11 into the vaporizing chamber 17, a pipe 18 in communication with the lower portion of tank 11 leads through conduit means 19, 20, and 21 in valve casings 22 and 23 to the vaporizing chamber 17. The amount of liquid flowing from tank 11 to the vaporizing chamber 17 is limited by a needle valve part 24 which is normally maintained at a predetermined distance from a valve seat 25 arranged in conduit means 20. The needle valve has a threaded outer end 26 which is held in place by a nut 27 and consequently the needle valve may be adjusted to permit the flow of the desired amount of liquid into the vaporizing chamber 17.

The vapors which are generated in chamber 17 are conducted therefrom by a pipe 28, one end of which is in communication with the vaporizing chamber 17 and the other end of which terminates in a flange 29 which is secured to a plate 29a. Plate 29a, in turn, is secured to a portion of the inlet pipe 9 by suitable means, such as bolts.

Flange 29 has a cylindrical opening, the internal diameter of which may be the same or substantially the same as the internal diameter of pipe 28, and is provided with conduit means 30 provided with a small outlet opening 31 arranged within the air passageway leading to the combustion chamber or combustion chambers of the engine and means, such as one or more nozzles, arranged within the passageway and associated with conduit means 30 are provided for inducting air into the passageway. The number of nozzles provided is sufficient to induct a comparatively large volume of air at high velocity and pressure into the passageway leading to the combustion chamber or combustion chambers of the engine and may range from one to four. Each of the nozzles has a restricted portion and may be in the form of a venturi tube in which the restriction is arranged intermediate its ends or adjacent to its inlet opening, or each of the nozzles may be provided with an enlarged inlet portion and a restricted outlet opening. As shown, two nozzles 32 and 33 are provided, each of which is arranged in alignment with or substantially in alignment with each other and with the conduit means 30 and each of which has an enlarged inlet opening and a restricted outlet opening, and to provide the most favorable results, the inlet opening of nozzle 32 should be even with or spaced a short distance beyond the outlet orifice of conduit means 30 and orifice 33 should be even with or spaced a short distance beyond the outlet orifice of nozzle 32. In accordance with the invention, a portion 34 of the inlet pipe is also preferably in the form of a Venturi tube which is in alignment with or substantially in alignment with conduit means 30 and nozzles 32 and 33 for inducting air into the annular space between the outer surface of nozzle 33 and the inlet pipe 9 to thereby increase the volume of air which is inducted into the passageway.

It will be noted that tank 11 is closed, the vaporizing chamber 17 has a comparatively large heating surface, that the amount of liquid which flows into the chamber is limited, and that conduit means 30 terminates in a comparatively small orifice. It is therefore apparent that vapors may be generated and maintained at a comparatively high pressure in the evaporator 13 and will flow through pipe 28 and conduit means 30 at a high pressure, such as at a gage pressure of approximately 700 pounds per square inch, and air from the atmosphere passing through the filter 10 and the air intake pipe 9 will be inducted at a comparatively high velocity and pressure into the nozzle 32 as indicated by the arrows A. The gage pressure of the mixture of air and vapors which enters nozzle 32 will be reduced substantially but will still be at a comparatively high pressure, such as approximately 100 pounds per square inch, when it flows through its outlet orifice 37 and consequently as the mixture of air and vapors from nozzle 32 flow into nozzle 33, air will also be drawn into nozzle 33 at a comparatively high velocity and pressure as indicated by the arrows B and this mixture of air and vapors will issue from the orifice 38 of nozzle 33 at a pressure of approximately 15 pounds per square inch. Because of the force of the mixture of air and vapors flowing through the outlet orifice 38 of nozzle 33, air at a high velocity and pressure will also be inducted into the passageway between inlet pipe 9 and the exterior of nozzle 33 by the force of the mixture of air and vapors flowing through the nozzle 33 and that portion 34 of the inlet pipe which is in the form of a Venturi tube as indicated by the arrows C. While, if desired, the restricted portion of nozzle 33 may extend a short distance into the portion 34 of the inlet pipe, the inlet of the Venturi portion 34 of the pipe 9 may, if desired, be even with or slightly beyond the outlet orifice 38 of nozzle 33.

While the air intake pipe 9 may be connected to the combustion chamber or combustion chambers of an internal combustion engine when the fuel is injected separately as in diesel engines, as illustrated in the drawings, pipe 9 is connected to the carburetor 2 so that the mixture of air and gas at a pressure substantially above atmospheric pressure will flow through the carburetor 2 and will draw fuel from the orifice of the fuel pipe extending therein. The mixture of air, fuel and gas at a pressure substantially above atmospheric pressure will then flow into the combustion chamber or combustion chambers of the engine and will increase the power of the engine. The gas that is present is small in comparison with the air and fuel and will therefore not affect the combustibility of the mixture and if a gas, such as steam, the vapors of an antiknock liquid, or a mixture thereof, is utilized to increase the velocity and pressure of the air flowing into the combustion chamber or combustion chambers of the engine, it will function in its usual manner to prevent knocking or detonation of the engine under load.

The nozzles may be supported in place by any desirable means, such as by vanes 39 and 40.

It will of course be understood that the induction of a large volume of air into the passageway leading to the combustion chamber or the combustion chambers of the engine is more desirable when high power is required than when the load is light. Means are therefore provided to terminate or lessen the flow of the gas into the air inlet passageway when the load is light and while various means may be provided for this purpose, such as by providing a valve in conduit means 28 which may be actuated by the opening and closing of the throttle valve, or by diverting a portion of the exhaust gases through a by-pass and arranging the evaporator in heat exchange relation with the diverted portion of the gases as disclosed more particularly in my copending application, Ser. No. 536,250, filed on even date herewith, and limiting or entirely shutting off the flow of exhaust gases that pass through the by-pass pipe by suitable means, such as a valve arranged in the by-pass pipe which may be actuated by thermostatic means as shown in my copending application or by the opening and closing of the throttle valve, or as shown in the drawings, means may be provided for restricting the amount of liquid that flows into the evaporator. For this purpose, a valve 41 is arranged in conduit means 19 and means are provided for opening valve 41 when the throttle valve is moved to its open position. As shown, an arm 42 is provided, one end of which is connected to the throttle valve and its other end is connected to one end of a rod 43. The other end of rod 33 extends loosely through a block 44 pivotally mounted on an arm 45. Arm 45 has one end connected to the valve 41 and its opposite end is connected to a spring 46 which normally holds valve 41 in a closed position. When the throttle valve is actuated by a rod 47 which is connected to the foot pedal of the vehicle in the usual manner, rod 43 is also moved and is provided with a collar 47 which engages block 44 and rotates arm 45 to open valve 41 against the force of spring 46.

Means are also provided to partly or fully close needle valve 21 in the event that the pressure in vaporizing chamber 17 exceeds a predetermined amount. For this purpose, a diaphragm 48 arranged in valve casing 21 is in operative association with the needle valve 21 and conduit means 49 is provided which extends from the vaporizing chamber 17 through an aperture in the diaphragm to the rear side of the diaphragm and when the pressure in the vaporizing chamber 17 and at the rear side of the diaphragm 48 exceeds a predetermined amount, it closes needle valve 21 against the force of a spring 50. Spring 50 has sufficient force, however, to maintain the needle valve in open position when the vapors within the chamber 17 of the evaporator 13 are at the desired pressure.

To equalize the pressure in the tank 11 and evaporator 13 when liquid is being drained from tank 11, conduit means 51 is provided, one end of which is in communication with the vaporizing chamber 17 and the other end of which is connected to the upper end of tank 11, and to enable the tank to be filled with liquid, a valve 52 is provided in conduit means 51 to cut off the flow of vapors into tank 11 while it is being filled. A plug 53 is also provided in valve casing 20 opposite to the needle valve to provide access to valve seat 25 for removing impurities deposited thereon from the liquid which is utilized in the system.

What is claimed is:

1. In combination with an internal combustion engine having combustion chambers, means providing an air intake passageway to the combustion chambers of said engine, means providing a passageway for the exhaust gases from the engine, a tank containing a liquid, the vapors of which when mixed with air and fuel in the combustion chambers of the engine assist in preventing detonation of the engine when the engine is under load, an evaporator, means for passing a predetermined amount of liquid from said tank to the evaporator and said evaporator being arranged in heat exchange relation with at least a sufficient portion of said exhaust gases to vaporize the liquid, means for conducting vapors from said evaporator including conduit means arranged in the air inlet passageway and having a small orifice which is insufficient in size to relieve the pressure of the vapors so that vapors from said evaporator will issue therefrom at a comparatively high pressure, and means arranged in said passageway which is substantially in alignment with said outlet orifice for inducting a large volume of air into said passageway at a comparatively high velocity and pressure to increase the power of said engine when fuel is supplied thereto.

2. In combination with an internal combustion engine having combustion chambers, means providing an air intake passageway to the combustion chambers of said engine, a throttle valve arranged in said passageway, means providing a passageway for the exhaust gases from the engine, a tank containing a liquid, the vapors of which when mixed with air and fuel in the combustion chambers of the engine assist in preventing detonation of the engine when the engine is under load, an evaporator, means for passing a predetermined amount of liquid from said tank to said evaporator and said evaporator being arranged in heat exchange relation with at least a sufficient portion of said exhaust gases to vaporize the liquid, means for conducting vapors from said evaporator including conduit means arranged in the air inlet passageway and having a small orifice which is insufficient in size to relieve the pressure of the vapors so that vapors from said evaporator will issue therefrom at a comparatively high pressure, means arranged in said passageway which is substantially in alignment with said outlet orifice for inducting a large volume of air into said passageway at a comparatively high velocity and pressure to increase the power of said engine when fuel is supplied thereto, and means for shutting off the vapors from said conduit means when the throttle valve is closed.

3. In combination with an internal combustion engine having combustion chambers and a pipe for exhaust gases, means for supplying fuel to said combustion chambers, means providing an air intake passageway leading from the atmosphere to the combustion chambers of said engine, a closed tank containing a liquid consisting predominantly of water, an evaporator arranged in heat exchange relation with at least a portion of the exhaust gases, means for conducting liquid from said tank to said evaporator, means for equalizing the pressure of vapors in said tank and said evaporator, means for conducting vapors from said evaporator including conduit means extending into the air inlet passageway and having a small outlet orifice, means for limiting the amount of liquid that is conducted to said evaporator from said tank and the area of said evaporator that is in heat exchange relation with the exhaust gases and the size of the outlet orifice of said conduit means being so proportioned that vapors from said evaporator will be maintained under pressure and will issue from the orifice of said conduit means at a comparatively high pressure, and means arranged in said inlet passageway including a nozzle having an inlet in alignment with the orifice of said conduit means for inducting a large volume of air at high velocity and pressure into the air inlet passageway to the combustion chambers of the engine to increase the power of said engine when fuel is supplied thereto.

4. In combination with an internal combustion engine having combustion chambers and a pipe for exhaust gases, means for supplying fuel to said combustion chambers, means providing an air intake passageway leading from the atmosphere to the combustion chambers of said engine, a throttle valve arranged in said inlet passageway and being movable between open and closed positions, a closed tank containing a liquid, an evaporator arranged in heat exchange relation with at least a portion of the exhaust gases, means for conducting liquid from said tank to said evaporator, means for equalizing the pressure of vapors in said tank and said evaporator, means for conducting vapors from said evaporator including conduit means extending into said passageway and having a small outlet orifice, means for limiting the amount of liquid that is conducted to said evaporator from said tank and the area of said evaporator that is in heat exchange relation with the exhaust gases and the size of the outlet orifice of said conduit means being so proportioned that vapors from said evaporator will be maintained under pressure and will issue from the orifice of said conduit means at a comparatively high pressure, means in said air inlet passageway including a nozzle arranged in alignment with the orifice of said conduit means for inducting a large volume of air at high velocity and pressure into the air inlet passageway to the combustion chambers of the engine to increase the power of said engine when fuel is supplied thereto, and means associated with said throttle valve and the conduit means leading from said tank to said evaporator for shutting off the supply of liquid to said evaporator when the throttle valve is in its closed position.

5. In combination with an internal combustion engine having combustion chambers arranged therein, an exhaust pipe for exhaust gases, and means for supplying air, fuel, and the vapors of an antiknock liquid at a comparatively high pressure to the combustion chambers of said engine, said means including a carburetor, an intake manifold connected to said carburetor and the combustion chambers of said engine, and an air intake pipe leading to said carburetor and providing a passageway from the atmosphere to the combustion chambers of said engine, means for supplying fuel to said carburetor, an evaporator arranged in heat exchange relation with at least a portion of the exhaust gases, means for supplying a predetermined amount of liquid to said evaporator, means for conducting vapors from said evaporator including conduit means arranged in said air inlet passageway, and the amount of liquid that is supplied to said evaporator, the area of said evaporator that is in heat exchange relation with the exhaust gases, and the size of the outlet orifice of said conduit means, being so proportioned that vapors will issue from said outlet orifice at a comparatively high pressure, and means including a nozzle arranged in said passageway in alignment with the orifice of said conduit means for inducting a large volume of air at a comparatively high velocity and pressure into said passageway and through said carburetor to the combustion chambers of the engine for increasing the power of said engine.

6. In combination with an internal combustion engine provided with combustion chambers, an exhaust pipe for the exhaust gases from said engine, a carburetor, means for supplying fuel to said carburetor, an intake manifold connected to said carburetor and the combustion chambers of said engine, a throttle valve arranged between said carburetor and the intake manifold of the engine which is movable between open and closed positions, and an air intake pipe connected to said carburetor and providing a passageway from the atmosphere to said combustion chambers, a closed tank for liquid, the vapors of which when mixed with air and fuel in the combustion chamber of the engine assist in preventing detonation of the engine when the engine is under heavy load, an evaporator, means for conducting a predetermined amount of liquid from said tank to said evaporator and said evaporator being arranged in heat exchange relation with at least a portion of the exhaust gases from said engine, means for conducting vapors from said evaporator including conduit means having a small outlet orifice arranged in the air inlet passageway so that vapors from said evaporator will issue therefrom at a comparatively high pressure, means arranged in said passageway including a nozzle having its inlet orifice arranged substantially in alignment with the outlet orifice of said conduit means for inducting a large volume of air at a comparatively high velocity and pressure into the combustion chambers of said engine, and means responsive to the closing of said throttle valve for preventing liquid from flowing to said evaporator from said tank.

7. In combination with an internal combustion engine having a combustion chamber therein, means for supplying fuel to the combustion chamber of said engine, means for providing an air passageway leading from the atmosphere to the combustion chamber of said engine, conduit means arranged in said passageway having a small outlet orifice, and means for forcing a gas through said outlet orifice at a comparatively high velocity for increasing the power of the engine when fuel is supplied thereto.

8. In combination with an internal combustion engine having combustion chambers and a pipe for exhaust gases, means for supplying fuel to the combustion chambers of the engine, means providing an air intake passageway leading from the atmosphere to the combustion chambers of the engine, a closed tank containing a liquid, an evaporator arranged in heat exchange relation with at least a portion of the exhaust gases, means for conducting liquid from said tank to said evaporator, means for equalizing the pressure in said tank and said evaporator, means for conducting vapors from said evaporator including conduit means extending into the air inlet passageway and having a small outlet orifice, and the area of the evaporator that is in heat exchange relation with the exhaust gases and the size of the outlet orifice of said conduit means being so proportioned that vapors from said evaporator will be maintained under pressure and will issue from the orifice of said conduit means at a comparatively high pressure for inducting air into said passageway to the combustion chambers of said engine for increasing the power of the engine when fuel is supplied thereto.

9. In combination with an internal combustion engine, means for providing an air passageway to the engine, conduit means having a small outlet orifice arranged in said passageway, means in communication with said conduit means for vaporizing a liquid, the vapors of which do not adversely affect the combustibility of a mixture of air and fuel, means for maintaining said vapors under sufficiently high presure so that they will issue from the outlet orifice of said conduit means in the form of a jet at high velocity, and said conduit means being so arranged in said passageway that the vapors issuing from its outlet orifice will flow in said passageway to the engine and will assist and augment the passage of air through said passageway to the engine.

10. In combination with an internal combustion engine, means for supplying fuel to said engine, means for providing an air passageway to said engine, conduit means arranged in said passageway having a small outlet orifice, means in communication with said conduit means for maintaining vapors which do not adversely affect the combustibility of a mixture of the air and fuel under sufficiently high pressure so that the vapors will issue in the form of a jet at a high velocity from the outlet orifice of said conduit means and the outlet orifice of said conduit means being so arranged that vapors issuing therefrom will flow through said passageway to said engine, and means arranged in said passageway in substantial alignment with the outlet orifice of said conduit means for inducting a large volume of air at comparatively high pressure and velocity into said passageway to increase the power of the engine when fuel is supplied thereto.

11. In combination with an internal combustion engine, means for supplying fuel to said engine, means for providing an air passageway to said engine, conduit means arranged in said passageway having a small outlet orifice, means in communication with said conduit means for vaporizing a liquid, the vapors of which do not adversely affect the combustibility of a mixture of air and fuel, means for maintaining said vapors under sufficiently high pressure so that they will issue from said outlet orifice in the form of a jet at high velocity, and the outlet orifice of said conduit means being so arranged that the vapors issuing therefrom will flow through said passageway to the engine, and means arranged in said passageway in substantial alignment with the outlet orifice of said conduit means for inducting a large volume of air at a comparatively high pressure and velocity in said passageway to the engine to increase the power of the engine when fuel is supplied thereto.

12. Apparatus as defined in claim 11 in which the liquid to be vaporized is water.

13. Apparatus as defined in claim 11 in which the liquid to be vaporized is an antiknock liquid.

14. Apparatus as defined in claim 11 in which the liquid to be vaporized is a supplementary fuel.

15. Apparatus as defined in claim 11 in which the liquid to be vaporized is a mixture of water and an antiknock liquid.

16. Apparatus as defined in claim 11 in which the liquid to be vaporized is a mixture of water and a supplementary fuel.

17. Apparatus as defined in claim 11 in which the liquid to be vaporized is a mixture of water and an antiknock liquid which is also a supplementary fuel.

18. In combination with an internal combustion engine, means for supplying fuel to said engine, means providing an air inlet passageway to the engine, means providing a passageway for exhaust gases from said engine, a closed tank for a liquid, the vapors of which do not adversely affect the combustibility of a mixture of air and fuel, an evaporator, means for conducting a predetermined amount of liquid from said tank to said evaporator, said evaporator having sufficient area arranged in heat exchange relation with at least a portion of said exhaust gases so that liquid passing from said tank to the evaporator will be vaporized and maintained under comparatively high pressure, means for conducting vapors from said evaporator to said air inlet passageway including conduit means arranged in the air inlet passageway having a restricted outlet orifice, and said conduit means being so arranged in said air inlet passageway that vapors issuing from its orifice will assist and augment the flow of air to the engine.

References Cited in the file of this patent
UNITED STATES PATENTS

| | | |
|---|---|---|
| 1,120,602 | Corser | Dec. 8, 1914 |
| 1,218,606 | Sturges | Mar. 6, 1917 |
| 1,377,535 | White | May 10, 1921 |
| 1,414,149 | Neisler | Apr. 25, 1922 |